(12) United States Patent
Glad (10) Patent No.: US 6,498,720 B2
(45) Date of Patent: Dec. 24, 2002

(54) CONNECTOR AND SUPPORT SYSTEM FOR A TOUCHPAD KEYBOARD FOR USE WITH PORTABLE ELECTRONIC APPLIANCES

(75) Inventor: Paul Glad, Taylorsville, UT (US)

(73) Assignee: Cirque Corporation, Salt Lake City, UT (US)

(*) Notice: Subject to any disclaimer, the term of this patent is extended or adjusted under 35 U.S.C. 154(b) by 0 days.

(21) Appl. No.: 10/039,223

(22) Filed: Jan. 4, 2002

(65) Prior Publication Data

US 2002/0109961 A1 Aug. 15, 2002

Related U.S. Application Data

(60) Provisional application No. 60/259,756, filed on Jan. 4, 2001.

(51) Int. Cl.$^7$ .............................. G05K 1/16; A47B 57/00
(52) U.S. Cl. .................. 361/680; 361/683; 400/82; 400/682; 248/918; 248/121; 248/135; 312/208.4
(58) Field of Search .................. 361/680, 683, 361/686; 400/82, 682, 691, 692, 693, 488, 489; 312/223.1, 208.4; 248/121–127, 130, 135, 136, 166, 349, 917–924

(56) References Cited

U.S. PATENT DOCUMENTS

| | | | | |
|---|---|---|---|---|
| 4,506,344 A | * | 3/1985 | Hubbard ...................... | 361/686 |
| 5,176,351 A | * | 1/1993 | Moore ........................ | 248/286 |
| 5,235,495 A | * | 8/1993 | Blair et al. ................... | 361/680 |
| 5,267,127 A | | 11/1993 | Pollitt | |
| 5,375,800 A | * | 12/1994 | Wilcox et al. ............... | 248/918 |
| 5,410,447 A | | 4/1995 | Miyagawa et al. | |
| 5,457,453 A | | 10/1995 | Chiu et al. | |
| 5,481,430 A | | 1/1996 | Miyagawa et al. | |
| 5,519,569 A | | 5/1996 | Sellers | |
| 5,532,904 A | | 7/1996 | Sellers | |
| 5,548,477 A | | 8/1996 | Kumar et al. | |
| 5,574,481 A | | 11/1996 | Lee | |
| 5,590,020 A | | 12/1996 | Sellers | |
| 5,590,382 A | | 12/1996 | Kikinis et al. | |
| 5,638,257 A | | 6/1997 | Kumar et al. | |
| 5,653,543 A | | 8/1997 | Abe | |
| 5,654,872 A | | 8/1997 | Sellers | |
| 5,659,307 A | | 8/1997 | Karidis et al. | |
| 5,677,826 A | | 10/1997 | Sellers | |
| 5,682,182 A | * | 10/1997 | Tsubosaka ................... | 361/680 |
| 5,703,578 A | | 12/1997 | Allison | |
| 5,712,760 A | | 1/1998 | Coulon et al. | |
| 5,733,056 A | | 3/1998 | Meagher | |
| 5,748,512 A | | 5/1998 | Vargas | |
| 5,788,386 A | | 8/1998 | Hayashi et al. | |
| 5,841,635 A | | 11/1998 | Sadler et al. | |
| 5,870,034 A | | 2/1999 | Wood | |
| 5,933,320 A | | 8/1999 | Malhi | |
| 5,941,648 A | | 8/1999 | Robinson et al. | |
| 6,108,200 A | * | 8/2000 | Fullerton .................... | 361/686 |
| 6,137,676 A | | 10/2000 | Merkel | |
| 6,147,858 A | * | 11/2000 | Takahasji .................... | 361/680 |
| 6,178,085 B1 | * | 1/2001 | Leung ........................ | 361/683 |
| 6,331,850 B1 | | 12/2001 | Olodort et al. | |

FOREIGN PATENT DOCUMENTS

EP 0 996 051 A2 4/2000

* cited by examiner

Primary Examiner—Lynn D. Feild
Assistant Examiner—Lisa Lea-Edmonds
(74) Attorney, Agent, or Firm—Morriss, Bateman, O'Bryant & Compagni (57) ABSTRACT

An adapter that electrically couples a portable touchpad keyboard to a portable electronic appliance, wherein the adapter couples a proprietary connector of a portable electronic appliance to an interface of the portable touchpad keyboard through a modified pin connector assembly, and wherein the portable touchpad keyboard also includes a physical support assembly on a bottom portion thereof, wherein the support assembly is unfolded and extended partway therefrom to thereby provide a physical support area on which to rest the portable electronic appliance, wherein the support assembly is unfolded in order to extend the support assembly far enough away from the portable touchpad keyboard to thereby support portable electronic appliances whose physical dimensions are relatively long when compared to a width of the portable touchpad keyboard.

10 Claims, 10 Drawing Sheets

CONNECTOR AND SUPPORT SYSTEM FOR A TOUCHPAD KEYBOARD FOR USE WITH PORTABLE ELECTRONIC APPLIANCES

CROSS-REFERENCE TO RELATED APPLICATIONS

This document claims priority to U.S. Provisional Patent Application Serial No. 60/259,756 filed Jan. 4, 2001, and entitled CONNECTOR AND SUPPORT SYSTEM FOR A TOUCHPAD KEYBOARD FOR USE WITH PORTABLE ELECTRONIC APPLIANCES.

THE FIELD OF THE INVENTION

This invention relates generally to a system for coupling a touchpad-based keyboard to a portable electronic appliance, wherein the system includes providing physical support for the portable electronic appliance when coupled to the touchpad keyboard, and interchangeable connectors that enable a plurality of different portable electronic appliances to be coupled to the same touchpad keyboard.

BACKGROUND OF THE INVENTION

The prior art of portable keyboards that can be coupled to portable electronic appliances includes mechanical keyboards. These mechanical keyboards apparently are of two different designs. The first design is generally smaller than a normal desktop-type keyboard, but is considered to be portable, or to at least be capable of being connected to a portable electronic appliance. The keys are discrete but small mechanical buttons, and so the design of the keyboard is simply smaller than a standard keyboard. It should be mentioned that the portable electronic devices include personal digital assistants (PDAs).

The next type of portable keyboard design is more mechanically complex than a miniaturized keyboard described above because it is designed to be more portable. The complexity comes from the desire to enable the keyboard to collapse so that it can be carried more easily. A collapsing keyboard is one that can be folded to a relatively compact shape. For example, a collapsible keyboard of the prior art will fold to make four different sections. The sections are relatively thin, but when stacked on top of each other in a folded position, the thickness is often greater than the thickness of even the largest PDA.

The collapsible keyboards are also mechanical in nature. That is, the buttons are mechanical, but generally larger than the keys found in a non-collapsible keyboard. This is because the ability to fold enables the keyboard to assume larger dimensions when unfolded into a usable position than the non-collapsible keyboards.

It has been observed that despite the proliferation of portable electronic devices, there are generally no standard interfaces to them. Furthermore, the interfaces, even along a product line of a single company continue to evolve. Thus, a portable keyboard must be designed specifically for each type of portable electronic device. This can become expensive for a purchaser and the manufacturer. This also reduces the ability of the manufacturer to respond to market demands because an entire keyboard must be manufactured, instead of taking an existing keyboard and providing an adapter that is specific to the portable electronic device.

Thus, it would be an advantage over the prior art to provide a single portable keyboard that was adaptable for use with a plurality of different portable electronic devices by providing an adapter.

It is also the case that the prior art portable mechanical keyboards are relatively large when compared to the size of the portable electronic device to which they are coupled.

Accordingly, it would be another advantage to provide a smaller portable keyboard that can be used with the plurality of different portable electronic devices, through the use of the adapter.

It is also noted that the portable mechanical keyboards of the prior art are generally more susceptible to breaking than a standard desktop keyboard. This is probably a function of the environment in which the keyboards operate. In other words, a portable device is going to be knocked around and receive rougher treatment than a stationary keyboard.

Accordingly, it would be another advantage to provide a keyboard input device for use with the adapters that is not as susceptible to damage as are the portable keyboards that have mechanical keys.

SUMMARY OF INVENTION

It is an object of the present invention to provide a connector and physical support system that enables a portable touchpad keyboard to be used with a plurality of different portable electronic appliances.

It is another object to provide a connector and support system that enables the portable touchpad keyboard to be used with the plurality of different portable electronic appliances by using an appropriate adapter selected from a plurality of adapters.

It is another object to provide a connector and physical support system that lowers costs for using a portable touchpad keyboard with a plurality of different portable electronic appliances by providing a portable touchpad keyboard that can be used with all of the portable electronic appliances.

It is another object to provide a connector and physical support system that provides a modified pin connector in the adapter that couples the portable touchpad keyboard to the portable electronic appliance.

In a preferred embodiment, the present invention is an adapter that electrically couples a portable touchpad keyboard to a portable electronic appliance, wherein the adapter couples a proprietary connector of a portable electronic appliance to an interface of the portable touchpad keyboard through a modified pin connector assembly, and wherein the portable touchpad keyboard also includes a physical support assembly on a bottom portion thereof, wherein the support assembly is unfolded and extended partway therefrom to thereby provide a physical support area on which to rest the portable electronic appliance, wherein the support assembly is unfolded in order to extend the support assembly far enough away from the portable touchpad keyboard to thereby support portable electronic appliances whose physical dimensions are relatively long when compared to a width of the portable touchpad keyboard.

In a first aspect of the invention, the modified pin connection is comprised of a saddle mount connector for coupling an adapter to an electronic circuit board of the portable touchpad keyboard.

In a second aspect of the invention, the saddle mount connector includes a tuning fork pin which couples the adapter to the PC board at a right angle.

In a third aspect of the invention, the support assembly pivots outward away from the underside of the portable touchpad keyboard to thereby extend itself beneath the portable electronic appliance, and thereby form a triangular support system.

These and other objects, features, advantages and alternative aspects of the present invention will become apparent to those skilled in the art from a consideration of the following detailed description taken in combination with the accompanying drawings.

DETAILED DESCRIPTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The presently preferred embodiment of the invention is an adapter that is coupled between a portable touchpad keyboard and a portable electronic appliance such as a personal digital assistant or mobile telephone. The specific portable electronic appliance being used is not an aspect of the invention. It is only relevant in the sense that the device being coupled to the portable touchpad keyboard is generally going to be portable to take advantage of the relatively small size of the keyboard. For example, it is envisioned that the present invention will be used with a PDA in a meeting or while traveling, to enable a user to couple the portable touchpad keyboard to the PDA and thereby more conveniently and rapidly enter information.

The present invention is really two items that enable the portable touchpad keyboard to be usable with a plurality of different portable electronic appliances. The first item is the adapter that includes a modified pin connection assembly. The second item is a physical support assembly that enables the portable touchpad keyboard to be disposed at a convenient angle when resting on a flat surface so that a display screen in the portable electronic appliance is easily viewable while using the portable touchpad keyboard. The flat surface could be a desktop, counter top, or even a book placed on a user's lap.

The first item is related to the second item in that the adapter is designed having an angle. The angle is such that the portable electronic appliance is tilted at an angle that is convenient for viewing the display screen. But the combination of the portable touchpad keyboard and most portable electronic appliances is such that the combination will fall over, putting the keyboard in an unusable position. Accordingly, the physical support assembly provides the support that is required to hold up the portable electronic appliance while the portable touchpad keyboard is being used. With this explanation, it is now possible to illustrate the components of the invention.

Figure 1:
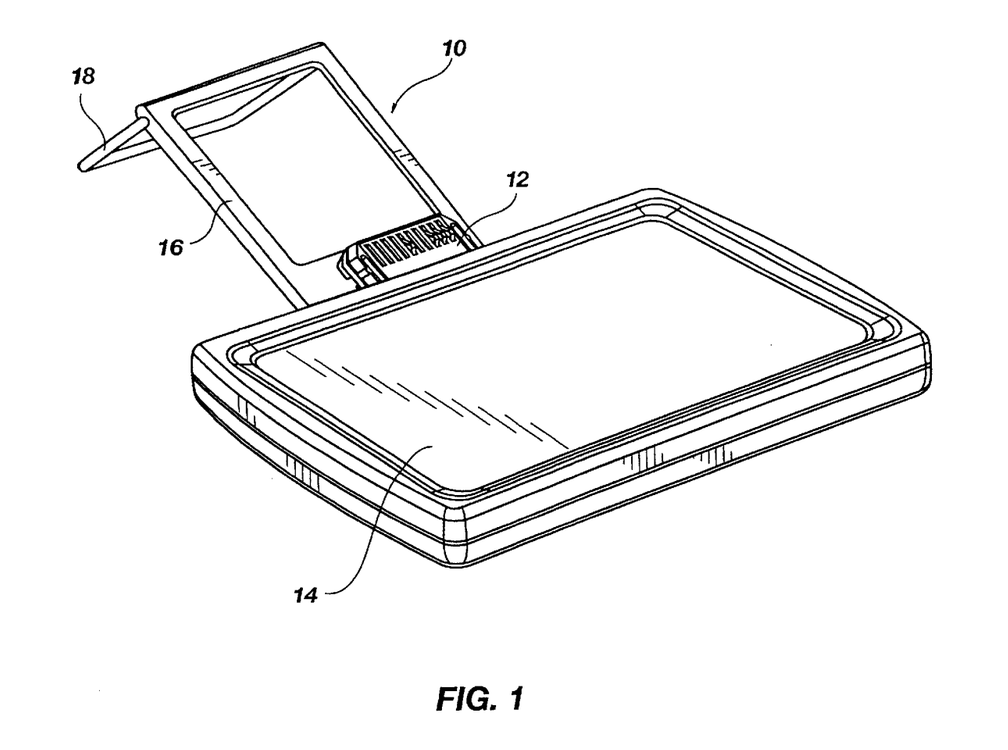
FIG. 1 is a perspective view of a physical support assembly and a portable touchpad keyboard.

FIG. 1 is a perspective view of a portion of the physical support assembly 10, a portion of an adapter 12, and a portable touchpad keyboard 14. The visible portion of the physical support assembly 10 includes a first support leg assembly 16, and a second support leg assembly 18.

Figures 2, 3:
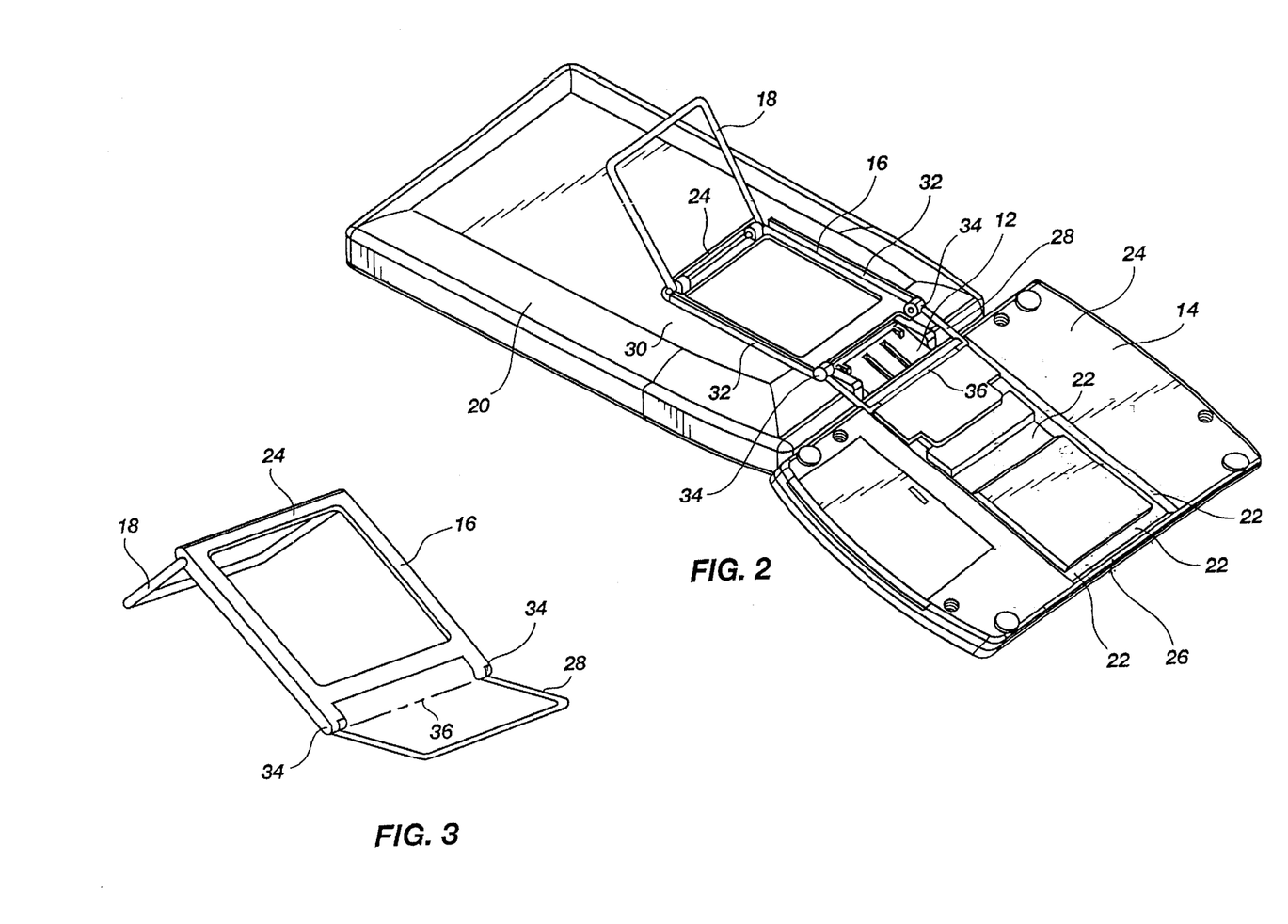
FIG. 2 is a perspective view of the physical support assembly and the portable touchpad keyboard of FIG. 1 as seen from below, and a portable electronic appliance.
FIG. 3 is a perspective view of the physical support structure.

Is a perspective view of a back side of the portable touchpad keyboard 14, the physical support assembly 10, and of a portable electronic appliance 20 shown in a position where it is coupled to the adapter 12. This view illustrates some important detail regarding the physical support assembly 10. Specifically, grooves or channels 22 are shown embedded into a back side 24 of the portable touchpad keyboard 14. These channels 22 correspond to the shape of the physical support assembly 10 when it is folded up and not in use. The physical support assembly 10 essentially snaps into place in the channels 22. A friction snap is preferably disposed at a pivot axis 24. The pivot axis 24 swings back toward the portable touchpad keyboard 14 and engages a corresponding friction point 26.

This figure also shows that the first support leg assembly 16 is essentially parallel to the back side 30 of the portable electronic appliance 20. The first support leg assembly is generally going to be flush against the back side 30, but this is not required. It is simply preferable to have the first support leg assembly 16 make as much contact as possible to increase stability of the combination.

The physical support assembly 10 is obviously shown in a folded out position. In order to minimize the amount of space that it occupies, the first support leg assembly 16 has a channel 32 along each side. The channel 32 enables the second support leg assembly 18 to lay inside the first support leg assembly when folded. When unfolded along pivot axis 24, the first and second support leg assemblies 16, 18 make a triangular shape relative to a flat resting surface as shown in FIG. 1.

FIG. 2 also shows that a third support leg assembly 28 is coupled to the first support leg assembly 16 at pivot points 34. The third support leg assembly 28 is pivotally engaged to the back side 24 of the portable touchpad keyboard 14 along pivot axis 36.

It should be possible to understand that the first function of the third leg support assembly 28 is to simply extend the physical support assembly 10 away from the portable touchpad keyboard 14 so as not to interfere with the adapter 12 when unfolded.

The second function of the third support leg assembly 28 is to extend the physical support assembly 10 far enough under the portable electronic appliance 20 to enable the combination to balance correctly, and remain upright. One reason is that the portable touchpad keyboard 14 is relatively light, and therefore will not likely anchor the combination by its own weight.

It is useful to remember the reason for providing the physical support assembly 10 in the first place. By disposing the physical support assembly 10 underneath the portable touchpad keyboard 14, it can be kept out of the way if it is not being used. In other words, it is possible to use the portable touchpad keyboard 14 in combination with the portable electronic appliance 20 without setting them down on a surface. The portable touchpad keyboard 14 is very light. It is also usable by just holding and supporting the portable electronic appliance 20 in a user's single hand. One hand holds the combination, and the other hand enters data by tapping keys on the portable touchpad keyboard 14.

FIG. 3 is a perspective view of the physical support assembly 10 without being attached to the portable touchpad keyboard 14. This view show the three separate leg assemblies, 16, 18 and 28 more clearly. The first support leg assembly 16 is presently made of plastic, and so that the channel 32 can easily be formed on the side that is opposite to this view. The second support leg assembly 18 is a thin piece of metal that is bent to form its present shape, wherein the ends are disposed into the pivoting axis 24. The second support leg assembly 18 is slightly smaller than the channel 32 so that it fits in easily. Finally, the third support leg assembly 28 is also a thin piece of metal that has been bent to its present shape, wherein the ends are disposed into the pivoting axis 36. Note that the third support leg assembly 28 does not fold over so as to fit within the channel 32 on the opposite side of the first support leg assembly 16. It is always extended away from the first support leg assembly 16.

It should be stated that the materials used in the support leg assemblies 16, 18, 28 can be modified as long as the function performed by the substitute materials is the same.

Figure 4:
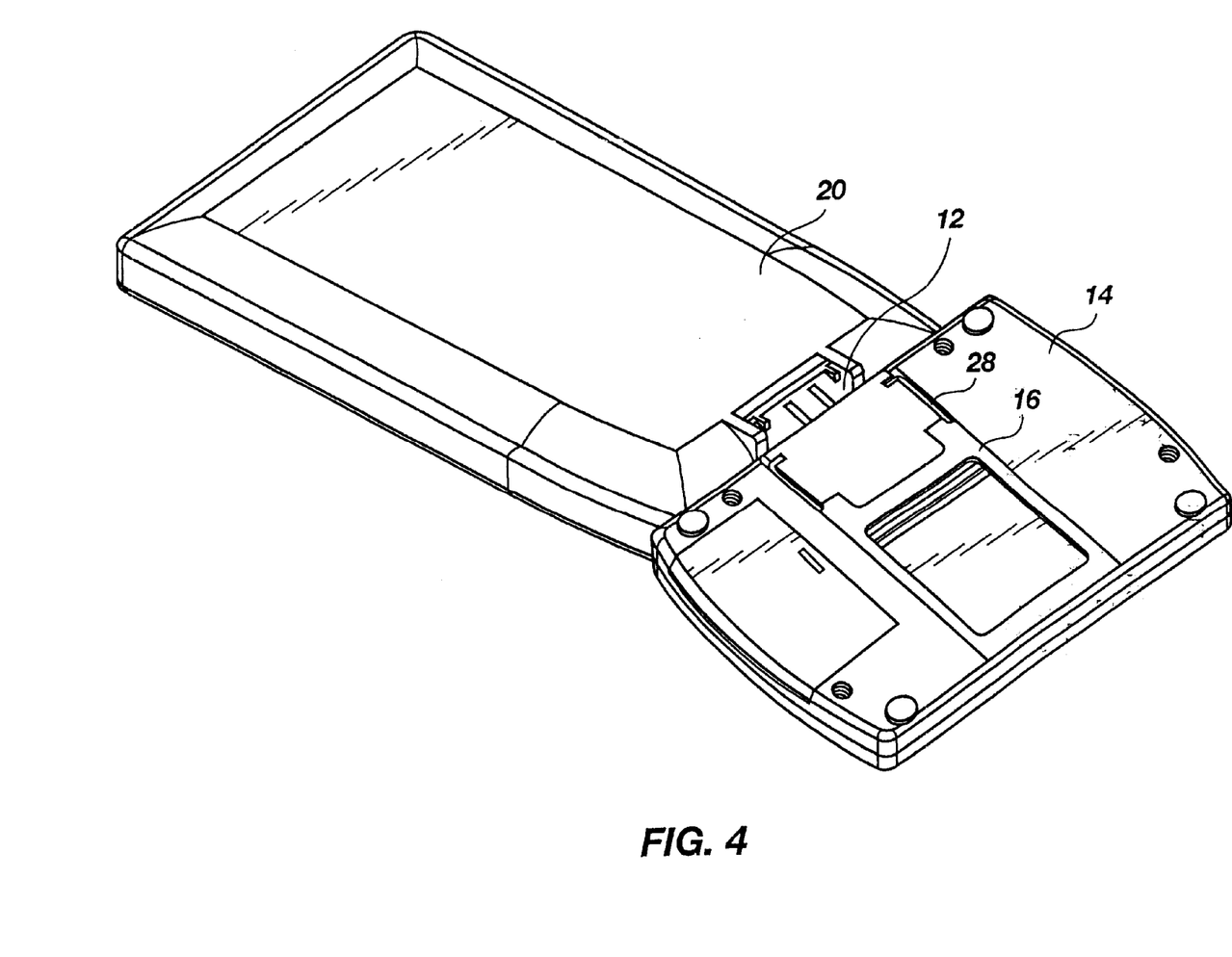
FIG. 4 is a perspective view of the physical support assembly, the portable touchpad keyboard, and the portable electronic appliance, with the physical support assembly folded away.

FIG. 4 is a perspective view similar to that of FIG. 2, with a change being that the physical support assembly 10 has now been folded up against the back side of the portable touchpad keyboard 14.

Figure 5:
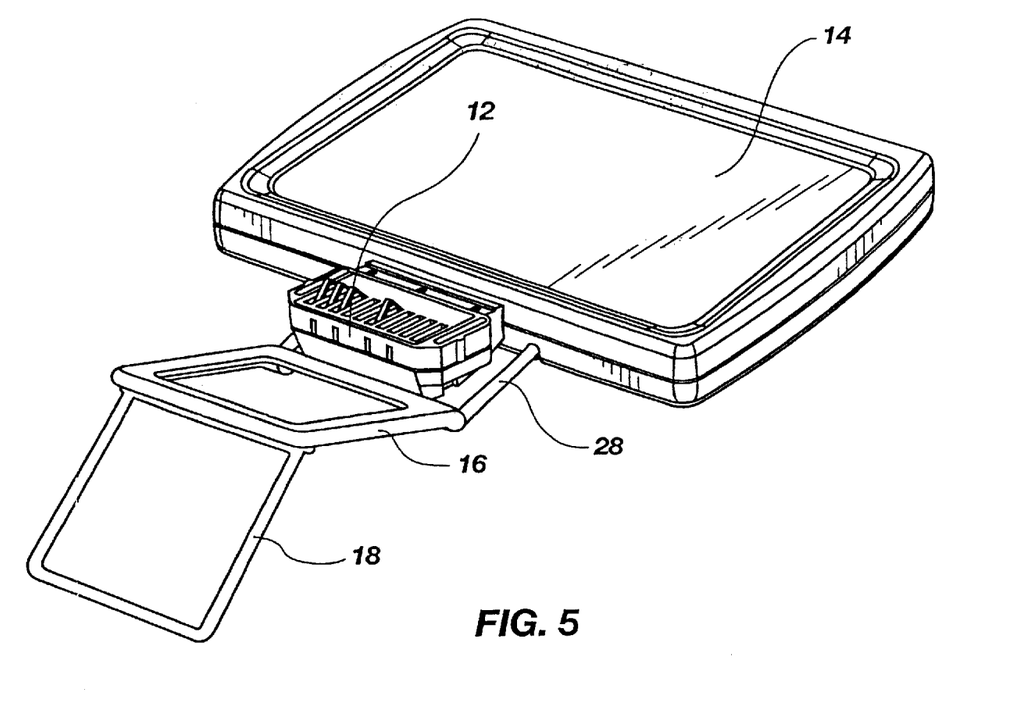
FIG. 5 is a different perspective view of the physical support assembly and the portable touchpad keyboard.

FIG. 5 is provided as a different perspective view of the physical support assembly 10, the adapter 12, and the portable touchpad keyboard 14 shown in FIG. 1.

Figure 6:
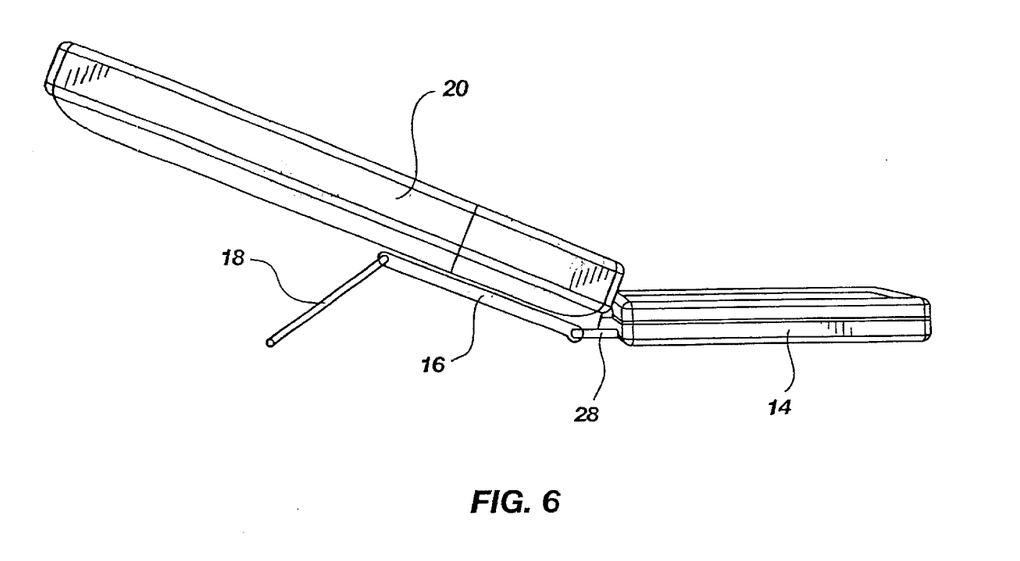
FIG. 6 is a profile view of the physical support assembly, the portable touchpad keyboard, and the portable electronic appliance.

FIG. 6 is a profile view of the physical support assembly 10, the adapter 12, the portable touchpad keyboard 14, and the portable electronic appliance 20. It should be noted that this view shows that the portable electronic appliance 20 is relatively close to the portable touchpad keyboard 14. In practice, the third support leg assembly 28 is longer than shown here in order to provide sufficient room for the elements to be combined.

However, it is also envisioned that in an alternative embodiment, the third support leg assembly 28 is designed to slide along the back side of the portable touchpad keyboard 14. By sliding, it would be possible to move the physical support assembly 10 further away from the portable touchpad keyboard 14, and thereby support a longer portable electronic device 20 having a center of gravity that is disposed further up its body.

Figure 7:
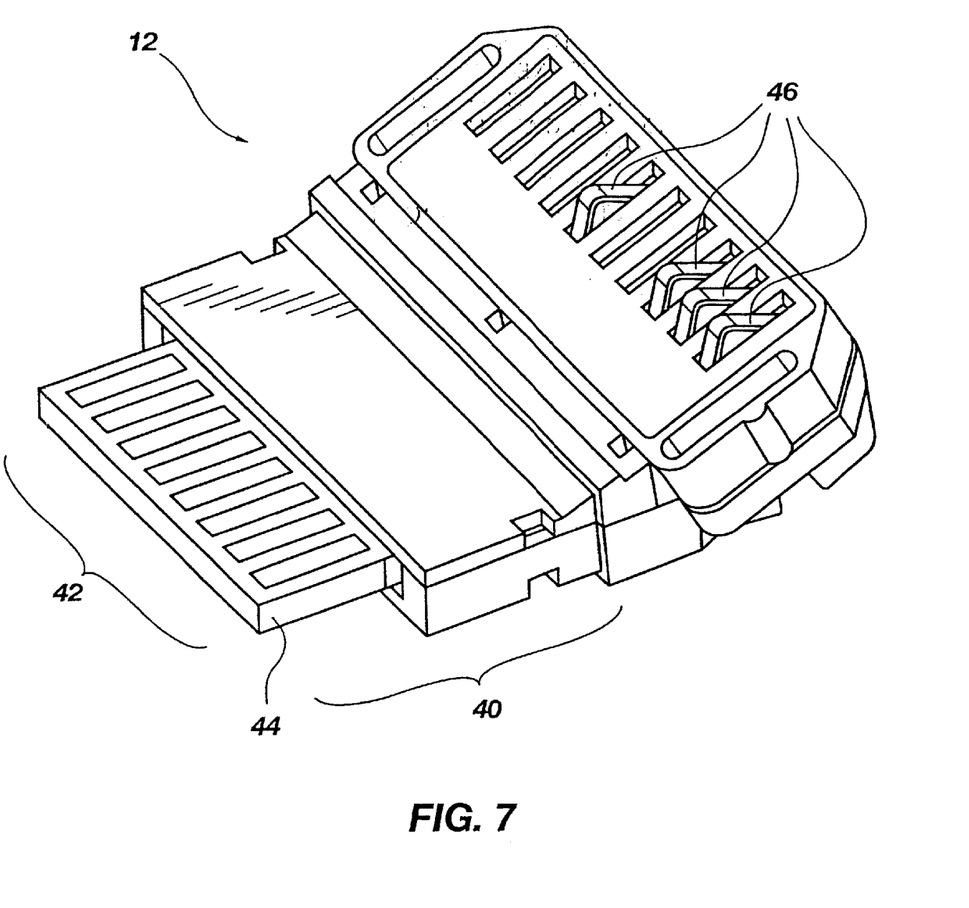
FIG. 7 is a perspective view of the adapter.

FIG. 7 is a perspective view of the adapter 12 show shows a top and one side thereof. The adapter 12 is made to form an angle that tilts the portable touchpad keyboard 14 towards the portable electronic appliance 20. In other words, the angle is going to be less than 180 degrees between the portable touchpad keyboard 14 and the portable electronic appliance 20. This angle enables the combination of the portable touchpad keyboard 14 and the portable electronic appliance 20 to be used in a more convenient manner when a display screen in the portable electronic appliance 20 is tilted towards a user.

The preferred angle of the adapter 12 is approximately 150 degrees between a first plane formed by a face of the portable touchpad keyboard 14 and a second place formed by a face of the portable electronic appliance 20. However, the angle formed by the adapter 12 can be modified, and a useful range of operation should be considered to be anything between 90 degrees and 180 degrees as defined above.

The adapter 12 shown in FIG. 7 includes a portion 40 that slides into a body of the portable touchpad keyboard 14. Of this portion 40, electrical contacts 42 are disposed on a printed circuit board 44. These electrical contacts 42 are in electrical communication with the electrical contacts 46 shown on the opposite end of the adapter 12. Only enough of these electrical contacts 46 are provided as are used by the portable electronic appliance 20. This reduces the cost of the adapter 12. The body of the adapter 12 is molded plastic as is known to those skilled in the art.

Figure 8:
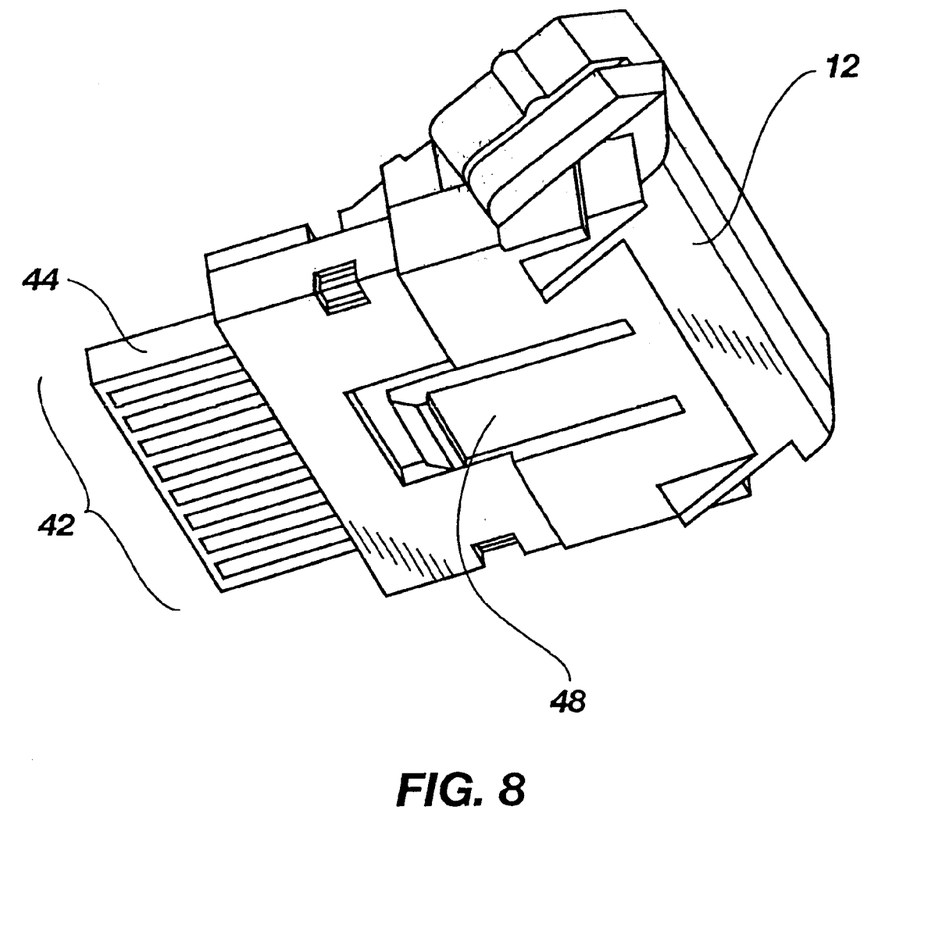
FIG. 8 is a different perspective view of the adapter.

FIG. 8 is provided as a perspective view of a bottom and side of the adapter 12 shown in FIG. 7. A feature not shown elsewhere is the tab 48 that helps to keep the adapter 12 coupled to the portable touchpad keyboard 14.

Figure 9:
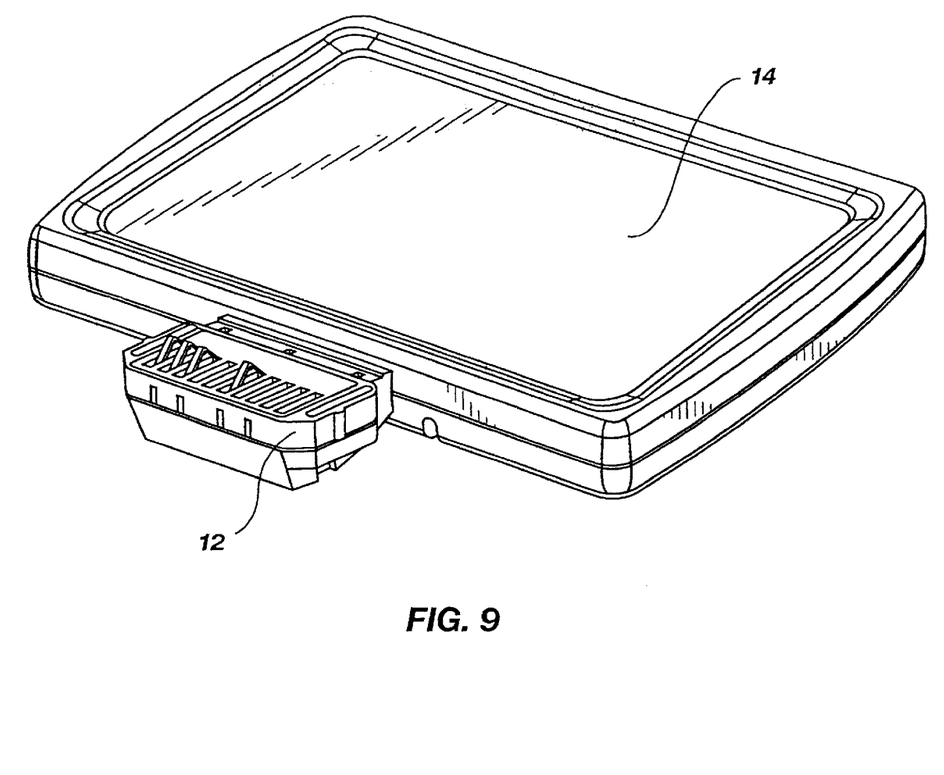
FIG. 9 is a perspective view of the adapter coupled to the portable touchpad keyboard.

FIG. 9 is provided as a perspective view of the adapter 12 coupled to the portable touchpad keyboard 12.

Figure 10:
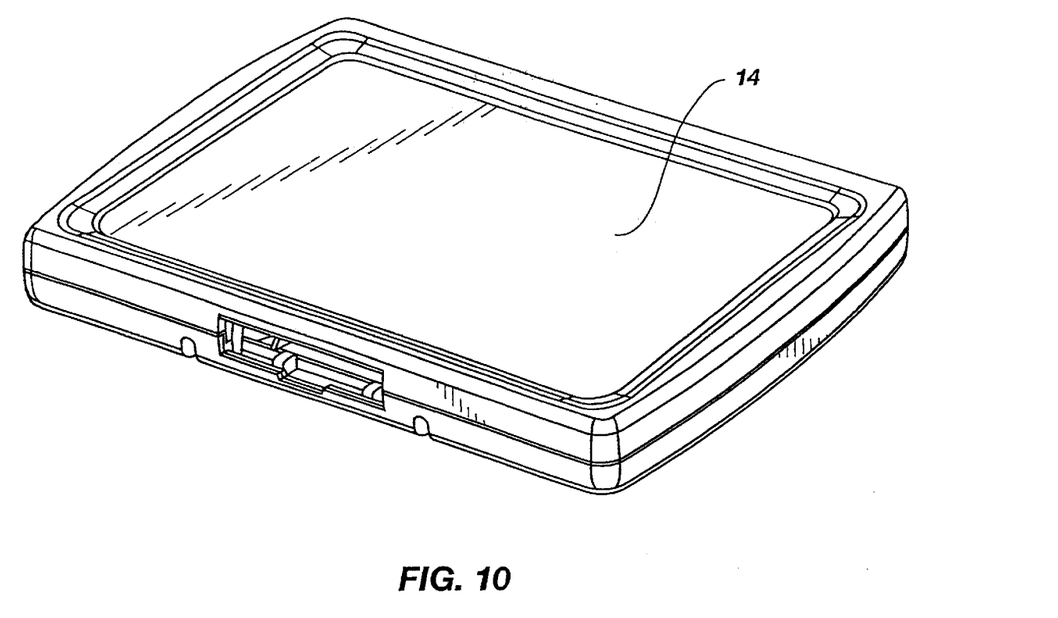
FIG. 10 is a perspective view of the portable touchpad keyboard shown in FIG. 9 with the adapter removed.

FIG. 10 is a perspective view of the portable touchpad keyboard 14 as seen with the adapter 12 removed therefrom.

Figure 11:
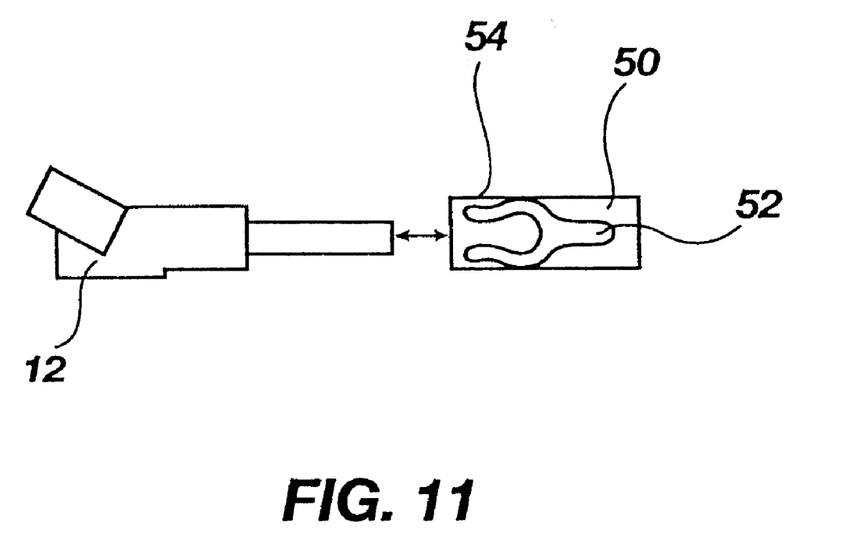
FIG. 11 is a profile view of an adapter that is about to be coupled to an electrical connector housing that is disposed in the portable touchpad keyboard.

FIG. 11 is a cut-away profile view of the adapter 12 and an electrical connector housing 50. This electrical connector housing 50 is disposed within the portable touchpad keyboard 12, and mates with the electrical contacts 42 of FIGS. 7 and 8. Inside the electrical connector housing 50 are disposed a plurality of electrical connectors 52 in parallel. These electrical connectors 52 are often referred to in the industry as tuning forks because of their shape. One of the tuning forks 52 is shown here in profile. The tuning forks 52 may have a slight inward inclination at the ends of the forks 54 in order to make a good electrical contact. When the tuning forks 52 are disposed in parallel inside the electrical connector housing 50, it forms what is called a saddle mount.

When the adapter 12 and the electrical connector housing 50 were developed, industry standard tuning forks 52 were used in the design. The stresses placed on the adapter 12 and the portable touchpad keyboard 14 are often such that the strain is delivered to the electrical connector housing 50. The tuning forks would bend. Thicker tuning forks 52 were critical to successful operation of the combination.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A physical support assembly for use with a portable touchpad keyboard, said physical support assembly comprising:
   a first support leg assembly;
   a second support leg assembly pivotally coupled to a first end of the first support leg assembly;
   a third support leg assembly pivotally coupled at a first end to a second end of the first support leg assembly; and
   a portable touchpad keyboard pivotally coupled to a second end of the third support leg assembly, wherein the third support leg assembly extends outwards from the portable touchpad keyboard in a keyboard plane, wherein the first support leg assembly makes an angle with respect to the keyboard plane, and wherein the second support leg assembly makes an angle with respect to the first support leg assembly so that the second support leg assembly touches the keyboard plane.

2. The physical support assembly as defined in claim 1 wherein the first support leg assembly and the second support leg assembly form a triangle with respect to the keyboard plane.

3. The physical support assembly as defined in claim 2 wherein the physical support assembly supports a portable electronic appliance tilted at an angle thereon, and wherein the physical support assembly enables an electrical connection to be made between the portable electronic appliance and the portable touchpad keyboard.

4. The physical support assembly as defined in claim 3 wherein at least a portion of the portable electronic appliance rests on at least a portion of the first support leg assembly.

5. The physical support assembly as defined in claim 4 wherein the third support leg assembly has a length sufficient to enable the physical support assembly not to interfere with a connection between the portable electronic appliance and the portable touchpad keyboard when the at least a portion of the portable electronic appliance is resting on the at least a portion of the first support leg assembly.

6. The physical support assembly as defined in claim 5 wherein the physical support assembly further comprises:
the second support leg assembly pivoting with respect to the first support leg assembly so as to rest against at least a portion of the first support leg assembly when in a folded position; and
the third support leg assembly pivoting with respect to the portable touchpad keyboard so as to be disposed against a back portion of the portable touchpad keyboard, and wherein the folded first and second support leg assemblies are disposed against the back portion of the portable touchpad keyboard when the portable touchpad keyboard is not in use.

7. The physical support assembly as defined in claim 6 wherein the back portion of the portable touchpad keyboard further comprises a recess for receiving the folded first and second support leg assemblies, and the third support leg assembly, so that the first, second, and third support leg assemblies do not extend outward from the back portion of the portable touchpad keyboard.

8. The physical support assembly as defined in claim 7 wherein the physical support assembly further comprises the first support leg assembly including a recess therein for the second support leg assembly to rest when folded.

9. The physical support assembly as defined in claim 8 wherein the physical support assembly further comprises:
the first support leg assembly comprising a plastic material;
the second support leg assembly comprising a metal wire; and
the third support leg assembly comprising a metal wire.

10. The physical support assembly as defined in claim 6 wherein the back portion of the portable touchpad keyboard further comprises two channels, wherein the two channel enable the third support leg assembly to slide therealong, wherein the two channel enable the third support leg assembly to adjust a length thereof to thereby enable a larger portable electronic appliance to the be coupled to the portable touchpad keyboard.

* * * * *